(12) United States Patent
Milchtaich

(10) Patent No.: US 9,615,255 B2
(45) Date of Patent: Apr. 4, 2017

(54) WIRELESS COMMUNICATIONS ACCESS SECURITY

(71) Applicant: CYBER-CANARY SECURITY LTD, Beer-Sheva (IL)

(72) Inventor: Doron Milchtaich, Rehovot (IL)

(73) Assignee: CORONET CYBER SECURITY LTD, Beer-Sheva (IL)

( * ) Notice: Subject to any disclaimer, the term of this patent is extended or adjusted under 35 U.S.C. 154(b) by 15 days.

(21) Appl. No.: 14/699,969

(22) Filed: Apr. 29, 2015

(65) Prior Publication Data

US 2016/0323746 A1 Nov. 3, 2016

(51) Int. Cl.
| | | |
|---|---|---|
| G06F 11/00 | (2006.01) |
| G06F 12/14 | (2006.01) |
| G06F 12/16 | (2006.01) |
| G08B 23/00 | (2006.01) |
| H04W 12/08 | (2009.01) |
| H04L 29/06 | (2006.01) |

(52) U.S. Cl.
CPC ......... *H04W 12/08* (2013.01); *H04L 63/1425* (2013.01)

(58) Field of Classification Search
CPC ......... H04L 63/18; H04L 63/02; H04W 12/08
USPC .......................................................... 726/22
See application file for complete search history.

(56) References Cited

U.S. PATENT DOCUMENTS

| | | | |
|---|---|---|---|
| 7,647,628 B2 | 1/2010 | Kebinger | |
| 7,716,337 B2 | 5/2010 | Yamakawa | |
| 8,230,505 B1* | 7/2012 | Ahrens | G06Q 10/02 |
| | | | 705/5 |
| 8,271,549 B2 | 9/2012 | Klein | |
| 2009/0106816 A1 | 4/2009 | Ito | |
| 2009/0307756 A1 | 12/2009 | Kang | |
| 2009/0320098 A1 | 12/2009 | Roberts | |
| 2010/0048167 A1 | 2/2010 | Chow et al. | |
| 2010/0162392 A1* | 6/2010 | Jeong | H04W 12/12 |
| | | | 726/22 |
| 2011/0034147 A1 | 2/2011 | Issa et al. | |
| 2011/0307376 A1 | 12/2011 | Woxblom | |
| 2012/0297308 A1 | 11/2012 | Anikul | |
| 2013/0041982 A1 | 2/2013 | Shi | |
| 2013/0347094 A1* | 12/2013 | Bettini | H04L 63/0245 |
| | | | 726/11 |
| 2016/0014613 A1* | 1/2016 | Ponnampalam | H04W 16/18 |
| | | | 370/254 |

* cited by examiner

*Primary Examiner* — Dant Shaifer Harriman
(74) *Attorney, Agent, or Firm* — Acuity Law Group, PC; Michael A. Whittaker

(57) ABSTRACT

A computer implemented method for wireless communications access security, the method comprising: measuring at least one parameter during a wireless communication with an active access point, calculating at least one indicator from the measured parameter(s), and determining a threat indication by applying a threat evaluation function on the calculated indicator(s).

21 Claims, 6 Drawing Sheets

WIRELESS COMMUNICATIONS ACCESS SECURITY

FIELD AND BACKGROUND OF THE INVENTION

The present invention relates to wireless communications and more particularly, but not exclusively to wireless communications access security apparatuses and methods.

Today, criminals are keen to exploit a wireless access point (say a Wi-Fi access point, a cellular base access point, etc., as described in further detail hereinbelow) so they can maliciously steal sensitive information from or commit fraud on client devices in communication with such a malicious wireless access point.

For example, criminals may use their malicious access point to attack client devices (say smart cellular phones, tablet computers, etc., as described in further detail hereinbelow) that unaware of the malicious nature of the access point, connect with the malicious access point.

Some of the most common attacks on client devices employed now days by criminals are the so-called "phishing" and "man-in-the-middle" attacks.

A phishing attack typically involves an attempt to acquire sensitive information from users of client devices—say usernames, passwords, credit card details, etc., by masquerading as a legitimate access point in a communication network.

Such a legitimate access point may be, for example, a mobile telecommunications network's cellular base station, an open access Wi-Fi access point of a wireless local area network in a Cafe, etc.

Attackers may masquerade as the legitimate wireless access point using their own wireless access point (e.g. a malicious access point). The user of the client device is fooled into connecting his client device to the attacker's malicious wireless access point instead of the legitimate wireless access point. Consequently, the attackers may gain access to sensitive information on the user's client device.

A man-in-the-middle attack is a form of eavesdropping in which an attacker makes independent connections with a user's client device and acts as a relay between the client device and a legitimate entity, such as a wireless access point or even another client device over a communication network.

The attacker can then control or eavesdrop on the user's wireless communication session. In such attacks, the attacker has to intercept all messages into and out of the client device, and inject new false messages into the communication session.

SUMMARY OF THE INVENTION

According to one aspect of the present invention there is provided a computer implemented method for wireless communications access security, the method comprising steps a computer processor of a client device is programmed to perform, the steps comprising: receiving a threat evaluation function from a server computer, measuring at least one parameter during a wireless communication with an active access point, calculating at least one indicator, each one of the indicators being calculated from at least one of the measured parameters, and determining a threat indication for the active access point by applying the threat evaluation function on the calculated indicators.

According to a second aspect of the present invention there is provided a non-transitory computer readable medium storing computer processor executable instructions for performing steps of wireless communications access security on a client device, the steps comprising: receiving a threat evaluation function from a server computer, measuring at least one parameter during a wireless communication with an active access point, calculating at least one indicator, each one of the indicators being calculated from at least one of the measured parameters, and determining a threat indication for the active access point by applying the threat evaluation function on the calculated indicators.

According to a third aspect of the present invention there is provided an apparatus for wireless communications access security, the apparatus comprising: a computer processor of a client device, a function receiver, implemented on the computer processor, configured to receive a threat evaluation function from a server computer, a parameter measurer, implemented on the computer processor, configured to measure at least one parameter during a wireless communication of the client device with an active access point, an indicator calculator, implemented on the computer processor, in communication with the function receiver and the parameter measurer, configured to calculate at least one indicator, each one of the indicators being calculated from at least one of the measured parameters, and a threat determiner, implemented on the computer processor, in communication with the indicator calculator, configured to determine a threat indication for the active access point by applying the received threat evaluation function on the calculated indicators.

According to a fourth aspect of the present invention there is provided a computer implemented method for wireless communications access security, the method comprising steps a server computer is programmed to perform, the steps comprising: from each one of a plurality of client devices, receiving at least one parameter set, each parameter set pertaining to a respective access point and comprising at least one parameter measured during a wireless communication between the client device and the access point; deriving a threat evaluation function from the parameter sets received from the client devices; and providing the derived threat evaluation function to a client device in communication with the server computer.

According to a fifth aspect of the present invention there is provided an apparatus for wireless communications access security, the apparatus comprising: a computer processor of a server computer, a parameter receiver, implemented on the computer processor, configured to receive from each one of a plurality of client devices at least one parameter set, each parameter set pertaining to a respective access point and comprising at least one parameter measured during a wireless communication between the access point and the client device, a function deriver, implemented on the computer processor, in communication with the parameter receiver, configured to derive a threat evaluation function from the parameter sets received from the client devices, and a function provider, implemented on the computer processor, in communication with the function deriver, configured to provide the derived threat evaluation function to a client device in communication with the server computer.

According to a sixth aspect of the present invention there is provided a non-transitory computer readable medium storing computer processor executable instructions for performing steps of wireless communications access security on a server computer, the steps comprising: from each one of a plurality of client devices, receiving at least one parameter set, each parameter set pertaining to a respective access point and comprising at least one parameter measured during a wireless communication between the client device and the access point, deriving a threat evaluation function from the parameter sets received from the client devices, and providing the derived threat evaluation function to a client device in communication with the server computer.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit.

As software, selected steps of the invention could be implemented as a plurality of software instructions being executed by a computer using any suitable operating system.

In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 1 is a block diagram schematically illustrating a first exemplary apparatus, for wireless communications access security, according to an exemplary embodiment of the present invention.

FIG. 2 is a block diagram schematically illustrating a second exemplary apparatus, for wireless communications access security, according to an exemplary embodiment of the present invention.

FIG. 3 is a flowchart illustrating a first exemplary method for wireless communications access security, according to an exemplary embodiment of the present invention.

FIG. 4 is a flowchart illustrating a second exemplary method for wireless communications access security, according to an exemplary embodiment of the present invention.

FIG. 5 is a block diagram schematically illustrating a first exemplary computer readable medium storing computer executable instructions for performing steps of wireless communications access security, according to an exemplary embodiment of the present invention.

FIG. 6 is a block diagram schematically illustrating a second exemplary computer readable medium storing computer executable instructions for performing steps of wireless communications access security, according to an exemplary embodiment of the present invention.

DESCRIPTION OF THE PREFERRED EMBODIMENTS

Figure 1:
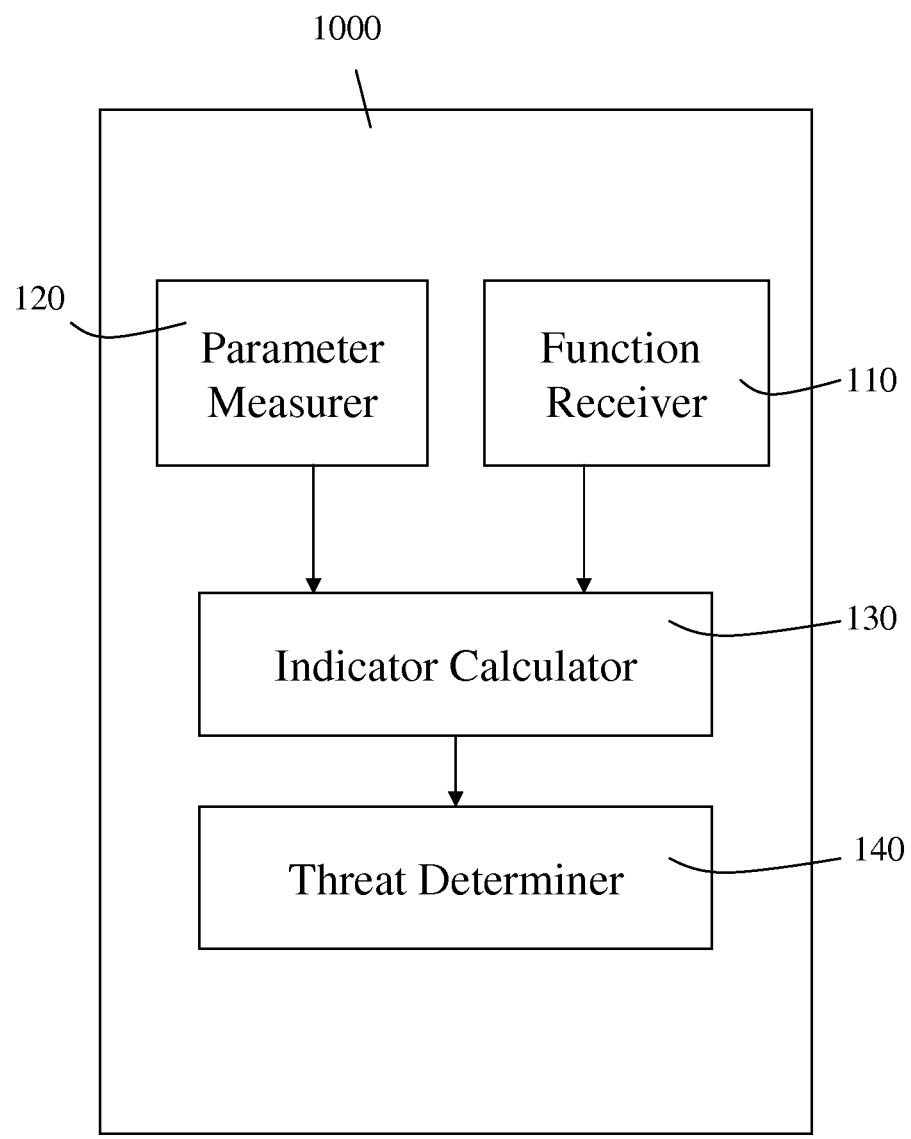

The present embodiments comprise an apparatus and method for wireless communications access security.

The present invention relates to wireless communications and more particularly, but not exclusively to wireless communications access security apparatuses and methods.

By now, criminals have learnt to exploit wireless communications access points (say cellular base stations or Wi-Fi access points), to steal sensitive information from or commit fraud on client devices (say mobile smart phones or tablet computers) in communication with the malicious wireless access points installed by the criminals.

For example, criminals may install and use a malicious access point to attack client devices. Unaware of the malicious nature of the access point, the client devices connect to the malicious access point, and become the criminals' victims in what is known as a phishing attack, a mad-in-the-middle attack, etc., as known in the art.

For example, a phishing attack usually involves an attempt to acquire sensitive information (say usernames, passwords, credit card details, etc.) from users of client devices, by masquerading as a trustworthy access point in a communication network.

An attacker may thus masquerade as a legitimate wireless access point using his own wireless access point (e.g. a malicious access point). A user of a client device may be mislead, and connect his client device to the attacker's malicious wireless access point instead of to the legitimate wireless access point. Consequently, the attacker may gain access to the sensitive information on the user's client device.

In such attacks, the attacker usually takes advantage of flaws which are inherent to many standard protocols in use on wireless communications networks, and does not break any formal protocol based rule applied by the networks.

Consequently, security mechanisms based on compliance with protocol rules in use on the wireless communications networks are not effective against the attacks.

According to an exemplary embodiment of the present invention, a server computer derives several reference sets.

Each one of the derived reference sets pertains to a specific access point and is based on a variety of parameters measured by client devices (say by cellular phones in use by different users) during communication with the specific access point, as described in further detail hereinbelow.

The parameters measured by client devices may include but are not limited to parameters which pertain to one or more of the access point's characteristics—say characteristics which belong to different ones of the OSI (Open Systems Interconnection) model layers, as described in further detail hereinbelow.

For example, a network's access point, such as a mobile telephony base station or a Wi-Fi wireless router, usually allocates a channel to each client device authenticated and granted access to the network.

The allocated channel may restrict communication of the client device to the access point, to a specific frequency, bandwidth, time slot, etc., or any combination thereof, as known in the art—i.e. to specific OSI physical layer characteristics.

Thus, in one example, the reference values may be derived by the server computer by averaging over frequencies, bandwidths, or time slots allocated to client devices by each one of the access points, and forwarded to the server computer from the client devices.

The server computer further derives a threat evaluation function.

The threat evaluation function is derived on the server computer from the measured parameters previously received form the client devices, from indicators derived on the client devices using those measured parameters and forwarded to the server computer, etc., as described in further detail hereinbelow.

Subsequently, when a user's client device (say a smart phone or a tablet computer) communicates with the server computer (say using a client agent which runs on the user's client device), the server computer provides the user's client device with the threat evaluation function, with one or more of the reference sets of values, or with both the threat evaluation function and the reference sets.

Each one of the reference sets provided to the user's client device, pertains to a specific access point—say to one of several access points in a geographical area of the user's client device, as derived using GPS (Global Positioning System), as described in further detail hereinbelow.

The reference set includes one or more reference values which the server computer derives, say from one or more parameters measured by other client devices when present in a geographical location similar to the user's client device (say within a predefined distance from the user's client device, as measured using GPS).

During wireless communication with an active access point—say by receiving a signal from the access point, by establishing a connection to the access point, by browsing the internet through the access point, etc. —the user's client device also measures one or more parameters.

The parameters measured by the user's client device may include but are not limited to parameters which pertain to one or more of the access point's characteristics—say characteristics which belong to different ones of the OSI (Open Systems Interconnection) model layers, as known in the art.

Then, the user's client device calculates one or more indicators.

The user's client device calculates each one of the indicators from at least one of the parameters measured by the user's client device during the wireless communication and optionally, the indicators are further based on at least one of the values received in the reference set which pertains to the active access point.

Then, the user's client device determines a threat indication for the active access point (say an indication that the active access point is malicious) by applying the threat evaluation function received from the server computer, on the calculated indicators.

Consequently, based on the determined indication, the user's client device may restrict or terminate the communication with the active access point, shift the communication to another access point, etc., as described in further detail hereinbelow.

The client device may thus potentially avoid further exposure to criminal activity carried out using the active access point when indicated as malicious, as described in further detail hereinbelow.

The client device of the present embodiments may include, but is not limited to any device used for wireless communications.

For example, the client device may include, but is not limited to wireless devices such as mobile phones (say smart phones), terminals, Laptop Computers, Handheld Point-of-Sale (POS) Devices, Tablet Computers, Desktop Computers, remote utilities telemetric devices, vehicle devices, etc., as known in the art.

The exemplary client devices may additionally or alternatively include a variety of devices with internet connectivity (commonly referred to today as Internet-of-Things (IOT) devices) and other devices that can connect wirelessly to a communication network, as known in the art.

The wireless access point of the present embodiments may include any device used to wirelessly connect a client device to a communications network and provide access services to the client device or even to wirelessly and independently communicate with the client device (say without connecting the client device to any network or other party).

Exemplary wireless access points may include, but is not limited to wireless communication devices such as wireless local area network access points, Wi-Fi access points, radio base stations, Femto-Cell Base Stations, Cellular Base Stations, a standalone Bluetooth™ or Wi-Fi communication device, etc., as know in the art.

In some examples, the access points may use second, third, fourth generation (2G/3G/4G) and beyond mobile technologies or standards—say Global System for Mobile Communications (GSM), Code division multiple access (CDMA), Universal Mobile Telecommunications System (UMTS), Long-Term Evolution (LTE), etc., as know in the art.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating a first exemplary apparatus, for wireless communications access security, according to an exemplary embodiment of the present invention.

An apparatus 1000 for wireless communications access security, according to one exemplary embodiment of the present invention, is implemented on a client device such as a smart mobile phone or a tablet computer, which client device is equipped with a computer processor, and with other hardware and software components.

The client device also includes communications hardware and software components (say drivers and communications cards), for wireless communication to another client device or to a wireless network such as a Wireless Local Area Network (WLAN), a Cellular Telephony Network, etc., as known in the art.

The wireless communication may involve communication to a wireless access point.

The wireless access point of the present embodiments may include any device used to wirelessly connect a client device to a communications network and provide access services to the client device.

The wireless access point of the present embodiments may additionally or alternatively include any device which wirelessly and independently communicates with the client alone (say without connecting the client device to any network or other party).

Exemplary wireless access points may include, but are not limited to wireless communication devices such as a Wi-Fi Access Point implemented on a Wi-Fi Router, a Cellular Network Base Station, a Femto-Cell Base Station, a stand-alone Bluetooth™ communication device, etc., as know in the art.

The apparatus 1000 includes the client device's computer processor and the one or more additional parts described hereinbelow, such as the parts denoted 110-140 in FIG. 1.

The additional parts may be implemented as software, say by programming the computer processor to execute steps of the methods described in further detail hereinbelow.

For example, parts 110-140 may be implemented as a computer application such an iPhone® App, which may be downloaded to the user's smart cellular phone (say an Apple® iPhone or a Samsung® Galaxy cellular phone) or tablet computer (say an Apple® iPad).

Optionally, the computer application is executed iteratively, each iteration being triggered by one or more predefined events (say one or more events which are predefined by the application's programmer) such as an attempt to connect to an access point, etc., as described in further detail hereinbelow.

Optionally, the computer application's iterations are rather triggered on a periodic basis, say every five minutes.

Thus, the exemplary first apparatus 1000 includes a function receiver 110 implemented on the client device's computer processor.

The function receiver 110 receives a threat evaluation function from a server computer—say from a server computer in remote communication with the function receiver 110 over the internet. Optionally, the function receiver 110 further receives from the server computer, one or more reference sets of values. Each one of the received reference sets pertains to a respective access point.

Optionally, the threat evaluation function is a function derived by the server computer from parameters measured by multiple client devices during wireless communication with access points, as described in further detail hereinbelow.

Optionally, each one of the reference sets is a set of reference values derived by the server computer from parameters measured by multiple client devices during wireless communication with access points, as described in further detail hereinbelow.

Optionally, at a later stage, the function receiver 110 further receives an update to the threat evaluation function from the computer server—say as a modification to one or more coefficients of a mathematical formula which represents the threat evaluation function.

The exemplary first apparatus 1000 further includes a parameter measurer 120.

When the function receiver 110 receives the threat evaluation function or later, the client device may be in wireless communication with an active access point, say with an active one of the access points which the reference sets pertain to.

For example, the client device may receive a signal from the active access point, establish a connection to the access point, register on the access point, browse the internet via the access point, etc., as known in the art.

During the wireless communication of the client device to the active access point, the parameter measurer 120 measures one or more parameters.

The parameters measured by the parameter measurer 120 may include, but are not limited to parameters which pertain to one or more characteristics—say characteristics which belong to different ones of the OSI (Open Systems Interconnection) model layers, as known in the art.

For example, a network's access point, such as a mobile telephony base station or a Wi-Fi wireless router, usually allocates a channel to each client device authenticated and granted access to the network.

The allocated channel may restrict communication of the client device to the access point, to a specific frequency, bandwidth, time slot, etc., or to any combination thereof, as known in the art—i.e. to specific radio-level OSI physical layer characteristics.

Thus in a first example, upon allowing the client device to access a network, the network's access point (say a mobile telephony base station or a Wi-Fi wireless router) allocates a channel to the client device and communicates the allocated channel's details to the client device, for the client device to use, as known in the art.

The allocated channel may restrict communication of the client device with the access point, to a specific frequency, bandwidth, time slot, etc., or to any combination thereof, as known in the art.

In the example, the parameter measurer 120 measures one or more of the parameters simply by reading the frequency, bandwidth, or time slot allocated by the access point, as described in further detail hereinbelow.

In a second example, the parameter measurer 120 measures one or more of the parameters, by measuring intensity or another characteristic of a radio signal received from the active access point, etc., as known in the art.

In a third example, one or more of the parameters measured by the parameter measurer 120 is the active access point's MAC (Media Access Control), a characteristic which belongs to the Point-to-Point Protocol (PPP) or to the ITU-T (International Telecommunication Union Telecommunication Standardization) protocol, or another OSI data-link layer characteristic of the access point.

In a fourth example, one or more of the parameters measured by the parameter measurer 120 is an SSID (Service Set Identifier) shown by the active access point.

In a fifth example, two or more of the parameters measured by the parameter measurer 120 are SSIDs (Service Set Identifiers) of some or all access points which appear active during the communication to the access point—say access points within radio reach, as per a radio scan by the parameter measurer 120, as known in the art.

The apparatus 1000 further includes an indicator calculator 130 in communication with the function receiver 110 and the parameter measurer 120.

The indicator calculator 130 calculates one or more indicators.

The indicator calculator 130 calculates each one of the indicators from one or more of the parameters measured by the parameter measurer 120.

Optionally, the indicator calculator 130 further bases the calculation of one or more of the indicators on one or more of the values received in the reference set which pertains to the active access point.

In one example, the indicator calculator 130 calculates the indicator by a simple averaging over values of one of the parameters, say on the parameter's values as measured by the parameter measurer 120 during a two hours long time frame preceding the indicator's calculation.

Optionally, the indicator calculator 130 calculates the indicator by a simple comparison between one of the measured parameters and a reference value calculated by the server computer and received in the reference set which pertains to the active access point.

Thus, in a first example, the indicator calculator 130 calculates the indicator by subtraction of the active access point's signal intensity from a reference value—say an average of intensities previously measured by neighboring client devices when in communication with the active access point, and sent to the server computer.

In a second example, the indicator calculator 130 calculates the indicator based on a stochastic model derived on the server computer for the active access point. In the example, the stochastic model assumes a normal distribution of the parameter's value, and the indicator calculator 130 uses an average and a standard deviation received in the reference set which pertains to the access point, for the indicator's calculation.

The average and a standard deviation are calculated for the parameter (say the signal intensity) on the server computer, from values of the parameter (say the intensity) as previously measured by neighboring client devices, as described in further detail hereinbelow.

Optionally, the parameter measurer 120 further maintains time based historic data reflecting a change in value of at least one of the measured parameters over time—say historic data which records and maps the values measured for each access point to different dates and communication hours, etc.

Consequently, the calculation of the indicators by the indicator calculator 130 may further be based on the maintained time based historic data.

The exemplary first apparatus 1000 further includes a threat determiner 140 in communication with the indicator calculator 130.

The threat determiner 140 determines a threat indication for the active access point, by applying the threat evaluation function received by the function receiver 110 on the indicators calculated by the indicator calculator 130.

Thus, in one example, the threat evaluation function yields a result which indicates that the active access point is malicious, whereas in another example, the threat evaluation function yields a result which indicates that the active access point is probably not malicious.

Optionally, the threat determiner 140 further warns the user, restricts the communication with the active access point according to the determined threat indication, etc., as described in further detail hereinbelow.

For example, the threat determiner 140 may warn the user (say by presenting a message on the client device's screen), restrict the communication to the access point (say to specific messages only), suspend the communication, shift the communication to another access point, etc., or any combination thereof.

Optionally, the apparatus 1000 further includes a location data sender (not shown) implemented on the client device's computer processor, say as a module of the computer application.

The location data sender sends data which indicates a location of the client device, to the server computer.

For example, the location data sender may send location data derived on the client device using a GPS (Global Positioning System) receiver or a DGPS (Differential GPS) receiver installed on the client device, as known in the art.

Optionally, one or more of the reference sets received by the function receiver 110 is a set of reference values selected by the server computer at least according to the indicated location, as described in further detail hereinbelow.

Optionally, one or more of the reference sets received by the function receiver 110 is a set of reference values selected by the server computer at least according to time—say a day, an hour, etc., as described in further detail hereinbelow.

Optionally, one or more of the reference sets received by the function receiver 110 is a set of reference values selected by the server computer at least according to the indicated location and time, as described in further detail hereinbelow.

Optionally, the function receiver 110 further receives from the server computer, a list of threat indications determined to be malicious by one or more neighboring client devices—say SSIDs of access points determined to be malicious, as described in further detail hereinbelow.

Consequently, the threat determiner 140 may warn the client device's user, restrict communication to the access points determined to be malicious, divert active communication to another access point, etc., as described in further detail hereinbelow.

The communications between the server computer and the client device may be periodic (say once in ten minutes), in parallel to communication with the access point, asynchronously with the communication to the access point, upon predefined events (such as an attempt to connect to the access point, or a communication which lasts for over two minutes), etc.

Figure 2:
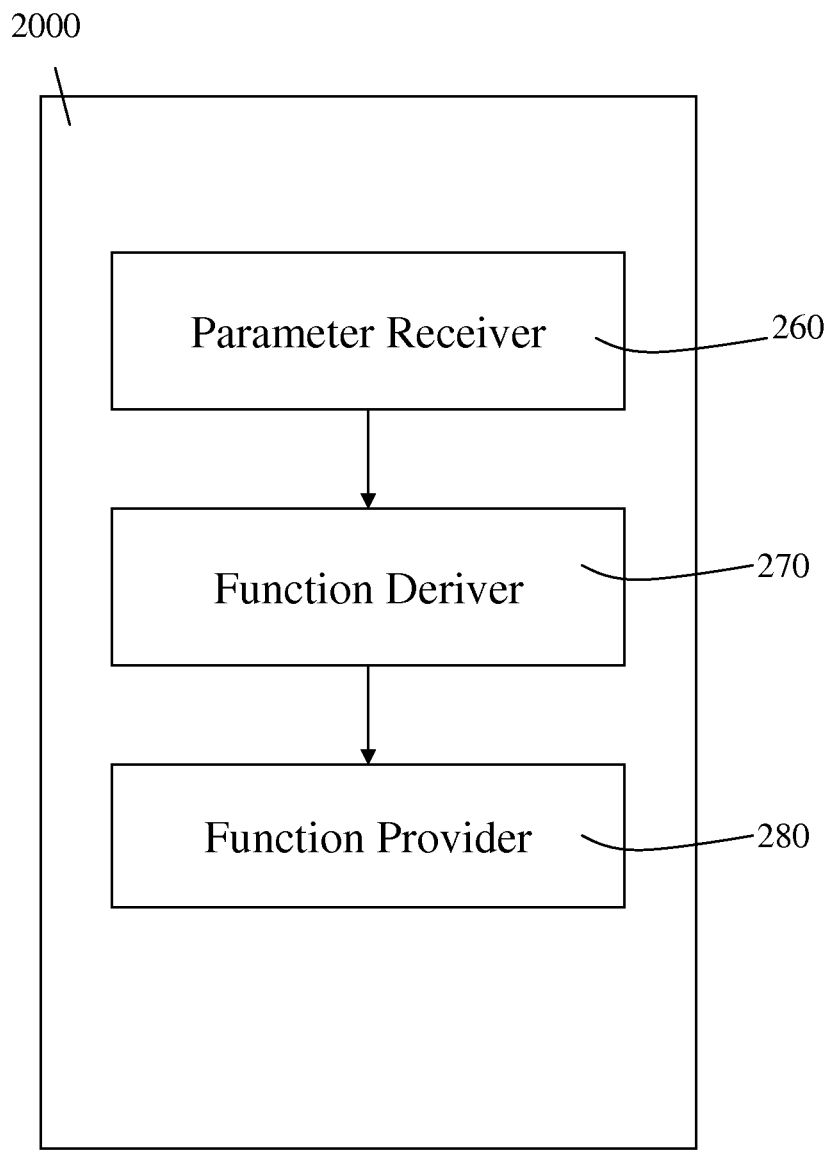

Reference is now made to FIG. 2, which is a block diagram schematically illustrating a second exemplary apparatus, for wireless communications access security, according to an exemplary embodiment of the present invention.

An apparatus 2000 for wireless communications access security, according to one exemplary embodiment of the present invention is implemented on a server computer which communicates with client devices such as a smart mobile phone, a tablet computer, a laptop computer, etc., as described in further detail hereinabove.

The apparatus 2000 includes the server computer's computer processor and the one or more additional parts described hereinbelow, such as the parts denoted 260-280 in FIG. 2.

The additional parts may be implemented as software, say by programming the computer processor to execute steps of the methods described in further detail hereinbelow.

Thus, the exemplary first apparatus 2000 includes a parameter receiver 260 implemented on the server computer's computer processor.

The parameter receiver 260 receives from each one of multiple client devices, one or more parameter sets.

Each one of the parameter sets pertains to a respective access point and includes one or more parameter values. The parameter values are measured during a wireless communication between the access point and the client device which the parameter set originates from.

The parameters measured by the client device may include, but are not limited to a variety of parameters which pertain to one or more of the access point's characteristics—say characteristics which belong to different ones of the OSI (Open Systems Interconnection) model layers, as described in further detail hereinabove.

For example, a network's access point, such as a mobile telephony base station or a Wi-Fi wireless router, usually allocates a channel to each client device authenticated and granted access to the network.

The allocated channel may restrict communication of the client device with the access point, to a specific frequency, bandwidth, time slot, etc., or any combination thereof, as known in the art—i.e. to specific OSI physical layer characteristics, as described in further detail hereinabove.

Thus, in a first example, the client device measures one or more of the parameter values simply by reading the frequency, bandwidth, or time slot allocated by the access point, say from channel allocation data sent from the access point to the client device, as known in the art.

In a second example, the client device measures one or more of the parameter values, by measuring intensity or another characteristic of a radio signal received from the active access point, etc., as known in the art.

In a third example, two or more of the parameters measured by the client device are SSIDs (Service Set Identifiers) of some or all access points which appear active during the wireless communication to the access point, as per a radio scan initiated on the client device, as described in further detail hereinabove.

The apparatus 2000 further includes a function deriver 270, in communication with the parameter receiver 260.

The function deriver 270 derives a threat evaluation function from the parameter sets received from the client devices.

Optionally, the function deriver 270 further derives a reference set of values for each respective one of at least some of the access points from the received parameter sets which pertain to the access point.

The function deriver 270 may derive the reference sets of values from the parameter sets received from the client devices, through one or more mathematical models applied on the measured values received in the parameter sets.

For example, the function deriver 270 may derive the reference sets by simple averaging over each parameter's values which originate from different ones of the client devices, by a standard persistency analysis method, by one of the stochastic methods in current use, etc., or by any combination thereof, as known in the art.

Thus, in one example, a first client device communicates with a first access point and during communication with the first access point, measures values of parameters which include: an intensity of a signal received from the first access point and a frequency of a channel allocated to the first client device by the first access point.

The first client device forwards a parameter set which includes the measured signal intensity and allocated frequency to the server computer's parameter receiver 260.

Similarly, a second client device also communicates with the first access point and measures intensity of a signal which the second client device receives from the first access point, and a frequency of a channel allocated to the second client device by the first access point, and forwards the two to the parameter receiver 260.

Further in the example, a third and other client devices measure and send values of the same parameters (i.e. the allocated frequency and the signal intensity) to the server computer's parameter receiver 260.

Consequently, the function deriver 270 derives a reference set of values from the parameter sets received from the first, second, third, and other client devices, which reference set pertains to the specific, first access point.

In the example, for each access point, the function deriver 270 derives two reference values from the signal intensities, by averaging over the signal intensity values measured by the client devices when in communication with the access point, to yield the two reference values—namely, the intensity mean and standard deviation.

Further in the example, for each access point, the function deriver 270 also derives three reference values from the frequencies allocated to the client devices—namely, the lowest allocated frequency, the highest allocated frequency, and the difference between each two of the frequencies.

Thus, in the example, a first reference set derived by the function deriver 270 includes both the two reference values derived from the measured signal intensities and the three reference values derived from the allocated frequencies (i.e. five reference values).

Further in the example, the parameter receiver 260 receives from each one of at least some of the client devices one or more parameter sets which pertain to a second access point.

Using the received parameter sets which pertain to the second access point, the function deriver 270 further derives a second reference set of values, which second reference set pertains to the specific, second access point.

Similarly, the function deriver 270 may derive multiple reference sets of values, such that each one of the derived reference sets pertains to an other access point, and is derived from parameters measured by each one of at least some of the client devices when in communication with the other access point.

Optionally, the function deriver 270 further maintains global data which maps all reference values derived by the function deriver 270, by time, location and access point—say in a multi-dimensional database table, as known in the art.

Optionally, the global data is based on measurements of parameter values of access points in different regions and countries, by many client devices, thus implementing a worldwide crowd sourcing of access point reference data.

Thus, in one example, one of the client devices provides the parameter receiver 260 with a new parameter set which pertains to a specific access point and which includes parameter values measured on a specific day of week, when the client device is in a specific location.

Consequently, the function deriver 270 updates one or more reference values maintained in the multi-dimensional table and mapped to the specific access point, week day, location, or any combination thereof—say reference values which give the access point's averaged signal and frequency for the week day and location.

In the example, the reference values maintained in the multi-dimensional table may be based on parameter measurements by different client devices, at different times of a recent history period covered by the multi-dimensional table—say the recent year or quarter (say per a definition by an administrator of the apparatus 2000).

Accordingly, one or more of the reference sets derived by the function deriver 270 is based on a sub-portion of the maintained global data, say on a segment of the multi-dimensional database table, which segment is delimited by time, location, and access point, and contains several different reference values.

For example, the segment may include a specific access point's average signal intensity, allocated frequency range, etc., for a specific time of communication by a client device, and location of the client device, as described in further detail hereinbelow.

The function deriver 270 may derives the threat evaluation function from all parameter sets received from the client devices, or rather from some of the client devices—say from client devices marked as trustworthy (say by an administrator or user of apparatus 2000), as described in further detail hereinbelow.

Optionally, the function deriver 270 further uses one or more indicators calculated on some or all of the client devices, from parameter values measured by the client device, for deriving the threat evaluation function, as described in further detail hereinbelow.

The apparatus 2000 further includes a function provider 280, in communication with the function deriver 270.

The function provider 280 provides the derived threat evaluation function, one or more of the derived reference sets, or both the function and the one or more reference sets, to a client device in communication with the server computer.

In a first example, when a user of a smart phone attempts to connect to a specific access point, a client application which runs on the smart phone's computer processor communicates a request for up-to-date reference values which pertain to the specific access point, to the server computer.

Based on the request, the server computer's function provider 280 sends a reference set which pertains to the specific access point, to the smart phone's client application. The sent reference set includes reference values derived by the server computer's function deriver 270 for the specific access point.

In the example, the function provider 280 further provides the smart phone's client application with a threat evaluation function derived by the server computer's function deriver 270 from parameter values measured by client devices during previous communications with access points.

In a second example, the server computer's function provider 280 sends reference sets derived by the server computer's function deriver 270 to the client device together with an update to the threat evaluation function periodically, say once a day or once an hour, as described in further detail hereinabove.

Optionally, the update to the threat evaluation function is a modification to one or more coefficients of a mathematical formula which represents the threat evaluation function, as described in further detail hereinabove.

Optionally, the function provider 280 selects the reference sets which the function provider 280 provides to the client device, according to the client device's location, according to time, etc., or any combination thereof.

In a first example, the function provider 280 selects one or more of the reference sets according to data which indicates the client device's location, and which is generated on the client device using GPS (Global Positioning System) or DGPS (Differential GPS), as described in further detail hereinbelow.

In a second example, the function provider 280 selects one or more of the reference sets according to time, say according to the hour or week day in which the reference sets are to be provided to the client device, as described in further detail hereinbelow.

In a third example, the function provider 280 selects one or more of the reference sets according to both the time and the client device's location indicated by the data generated on the client device using GPS or DGPS, as described in further detail hereinbelow.

Optionally, the function provider 280 selects the reference sets by retrieving a segment of reference values from the global data, according to time and location (say from the multi-dimensional database table), as described in further detail hereinbelow.

In one example, each one of the selected reference sets includes the specific access point's average signal intensity, allocated frequency range, etc., for a specific time of communication by any client device having the location of the client device in communication with the server computer, as described in further detail hereinbelow.

Optionally, the parameter receiver 260 further receives from each client device of a group which includes one or more of the client devices, one or more indicator sets, and the function deriver 270 derives the threat evaluation function from both the received indicator sets and the received parameter sets.

Each one of the indicator sets received from the client device of the group pertains to a specific one of the access points and includes one or more indicators.

Each indicator value in set is calculated by the client device from at least one of the parameters measured by the client device during a wireless communication with the specific access point. Optionally, the calculation of at least one of the indicators is further based on at least one of the values received on the client device, in the reference set which pertains to the specific access point.

Optionally, the function deriver 270 further sub-samples the received indicator sets, thus narrowing down the number of indicators, to be used for deriving the function.

For example, the function deriver 270 may remove duplicates, randomly select a number of the indicators for the deriving, discard indicators which are known to be less predictive in as far as the maliciousness of an access point is concerned, etc., as described in further detail hereinbelow.

Optionally, the function deriver 270 further annotates each one of at least a portion of the received indicator sets as malicious or non-malicious, say in a supervised way (say manually, by an administrator), in an unsupervised way (say based on statistical deviation measured over all of the received indicator values), etc., or in a way which combines the two, as described in further detail hereinbelow.

Optionally, for deriving the threat evaluation function from the indicator values in the annotated indicator sets, the function deriver 270 further uses classification methods such as SVM (Support Vector Machines), Random Forests (of decision trees), etc., or any combination thereof, as known in the art.

Optionally, for deriving the threat evaluation function, the function deriver 270 further uses dimensionality changing methods such as Mercer Kernels Similarity Functions, Bootstrap Aggregation, etc., or any combination thereof, as known in the art.

Optionally, the apparatus further includes a threat indication sender, implemented on the server computer's processor (not shown).

The threat indication sender sends to the client device in communication with the server computer, a list of threat indications determined by one or more neighboring client devices and sent to the server computer by the neighboring client devices—say a list of SSIDs of access points determined to be malicious.

In one example, for the purpose of the list, client device are deemed neighboring if situated within a predefined (say by an administrator of the apparatus) geographical distance from the client device's location as extracted by the client device, say using GPS, as described in further detail hereinbelow.

Optionally, the threat indication sender sends the list of determined threat indications to the client device in communication with the server computer, even before the client device measures the parameters for a current communication with an active access point.

Thus, in one example, several client devices identify certain access points as malicious, say using the methods of the present invention or using one or more different methods, and convey data on the access points identified as malicious to the server computer.

Consequently, in the example, the threat indication sender provides the client device in communication with the server computer, with a list of access points identified as malicious, and situated within a predefined geographical distance from the client device's location as extracted by the client device, say using GPS.

Figure 3:
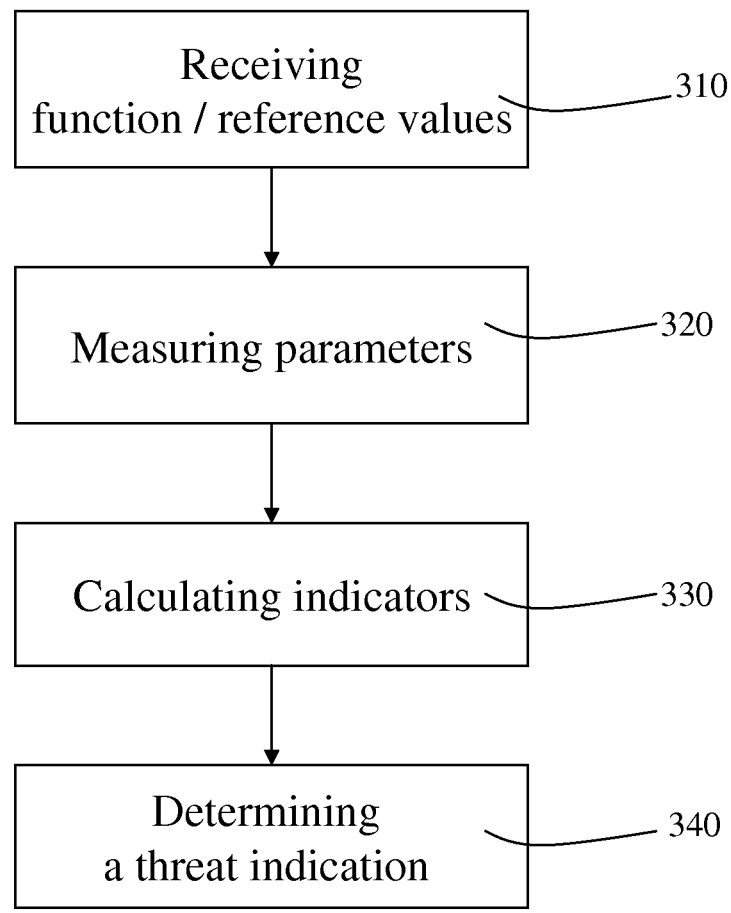

Reference is now made to FIG. 3, which is a flowchart illustrating a first exemplary method for wireless communications access security, according to an exemplary embodiment of the present invention.

A first exemplary method for wireless communications access security, according to an exemplary embodiment of the present invention, may be executed by a computer processor of a client device such as a smart mobile phone or a tablet computer, as described in further detail hereinabove.

For example, the first exemplary method may be executed by a computer application such an iPhone® App, which may be downloaded to the user's smart cellular phone (say an Apple® iPhone or a Samsung® Galaxy cellular phone) or tablet computer (say an Apple® iPad), as described in further detail hereinabove.

In the method, there are received 310 a threat evaluation function from a remote server computer, say by the function receiver 110 of the first exemplary apparatus 1000, as described in further detail hereinabove.

Optionally, there are further received 310 from the server computer, one or more reference sets of values. Each one of the received 310 reference sets pertains to a respective access point, as described in further detail hereinabove.

In one example, the threat evaluation function, the reference sets of values, or both the function and the reference sets, are received 310 from a server computer—say from a server computer in remote communication with the function receiver 110, over the internet.

Optionally, each one of the received 310 reference sets is a set of reference values derived by the server computer from parameters measured by multiple client devices during wireless communication with access points, as described in further detail hereinbelow.

Optionally, the received 310 threat evaluation function is a function derived by the server computer from parameters measured by multiple client devices during wireless communication with access points, as described in further detail hereinbelow.

Optionally, at a later stage, there is further received 310 an update to the threat evaluation function from the computer server—say as a modification to one or more coefficients of a mathematical formula which represents the threat evaluation function.

During the receipt 310 or at a later stage, the client device may be in wireless communication with an active access point, say with an active one of the access points which the received 310 reference sets pertain to.

For example, the client device may receive a signal from the active access point, establish a connection to the active access point, register on the active access point, browse the internet via the active access point, etc., as known in the art.

During the wireless communication of the client device to the active access point, there are measured 320 one or more parameters, say by the parameter measurer 120, as described in further detail hereinabove.

The measured 320 parameters may include, but are not limited to parameters which pertain to one or more characteristics—say characteristics which belong to different ones of the OSI (Open Systems Interconnection) model layers, as described in further detail hereinabove.

In a first example, upon allowing the client device to access a network, the network's access point (say a mobile telephony base station or a wireless router) allocates a channel to the client device and communicates the channel's details to the client device, for the client device to use, as described in further detail hereinabove.

The allocated channel may restrict communication of the client device with the access point, to a specific frequency, bandwidth, time slot, etc., or to any combination thereof, as described in further detail hereinabove.

In the example, one or more of the parameters are measured 320 simply by reading the frequency, bandwidth, or time slot allocated by the access point, say from channel allocation data sent from the access point to the client device, as known in the art.

In a second example, one or more of the measures 320 parameters is an intensity or another characteristic of a radio signal received from the active access point, etc., as known in the art.

In a third example, one or more of the measured 320 parameters is the active access point's MAC (Media Access Control), a characteristic which belongs to the Point-to-Point Protocol (PPP) or to the ITU-T (International Telecommunication Union Telecommunication Standardization) protocol, or another OSI data-link layer characteristic of the access point.

In a fourth example, one or more of the measured 320 parameters is an SSID (Service Set Identifier) shown by the active access point.

In a fifth example, two or more of the measured 320 parameters are SSIDs (Service Set Identifiers) of some or all access points which appear active during the wireless communication to the access point (say all access points within radio reach, as per a radio scan initiated by the parameter measurer 120 of apparatus 1000).

The measured 320 parameters may additionally or alternatively include one or more other characteristic of the active access point, say the active access point's location, etc., as known in the art.

Next, there are calculated 330 one or more indicators, say by the indicator calculator 130 of the first exemplary apparatus 1000.

Each one of the indicators is calculated 330 from one or more of the measured 320 parameters.

Optionally, the calculation 330 of one or more of the indicators is further based on one or more of the values received 310 in the reference set which pertains to the active access point.

In one example, the indicator is calculated 330 by a simple averaging over values of one of the parameters, say on the parameter's values as measured 320 during a two hours long time frame preceding the indicator's calculation 330.

Optionally, the indicator is calculated 330 by a simple comparison between one of the measured 320 parameters and a reference value calculated by the server computer and received 310 in the reference set which pertains to the active access point.

Thus, in a first example, the indicator is calculated 330 by subtraction of the active access point's signal intensity from a reference value—say an average of intensities previously measured by neighboring client devices when in communication with the active access point, and sent to the server computer.

In a second example, the indicator is calculated 330 based on a stochastic model derived on the server computer for the active access point. In the example, the stochastic model assumes a normal distribution of the parameter's value, and the indicator is calculated 330 using an average and a standard deviation received 310 in the reference set which pertains to the access point.

The average and a standard deviation are calculated for the parameter (say the signal intensity) on the server computer, from values of the parameter (say the intensity) as previously measured by neighboring client devices, as described in further detail hereinbelow.

Optionally, in the method, there is further maintained time based historic data reflecting a change in value of at least one of the measured 320 parameters over time, say by the parameter measurer 120. In one example, the historic data records and maps the values measured 320 for each access point to different dates and hours of communication, etc., as described in further detail hereinabove.

Consequently, the calculation 330 of the indicators may be further based on the maintained time based historic data.

Next, there is determined 340 a threat indication for the active access point, by applying the received 310 threat evaluation function on the calculated 330 indicators, say by the threat determiner 140, as described in further detail hereinabove.

Thus, in one example, the threat evaluation function yields a result which indicates that the active access point is malicious, whereas in another example, the threat evaluation function yields a result which indicates that the active access point is probably not malicious.

Optionally, following the determining 340, the communication with the active access point is restricted according to the determined 340 threat indication, the user of the client device is warned, etc.

For example, the threat determiner 140 may warn the user (say by presenting a message on the client device's screen), restrict the communication to the access point (say to specific messages only), suspend the communication, shift the communication to another access point, etc., or any combination thereof.

Optionally, further in the method, there is sent data which indicates a location of the client device to the server computer, say by the location data sender, as described in further detail hereinabove.

For example, the location data sender may send location data derived on the client device using a GPS (Global Positioning System) receiver or a DGPS (Differential GPS) receiver installed on the client device, as known in the art.

Optionally, one or more of the received 310 reference sets is a set of reference values selected by the server computer at least according to the indicated location, as described in further detail hereinabove.

Optionally, one or more of the received 310 reference sets is a set of reference values selected by the server computer at least according to time—say a day, an hour, etc., as described in further detail hereinabove.

Optionally, one or more of the received 310 reference sets is a set of reference values selected by the server computer at least according to the indicated location and time, as described in further detail hereinabove.

Optionally, in the method, there are further received 310 from the server computer, a list of threat indications determined to be malicious by one or more neighboring client devices—say SSIDs of access points determined to be malicious, as described in further detail hereinbelow.

Consequently, the client device's user may be warned, the communication to the access points determined to be malicious may be restricted, suspended, or diverted to another access point, etc.

Figure 4:
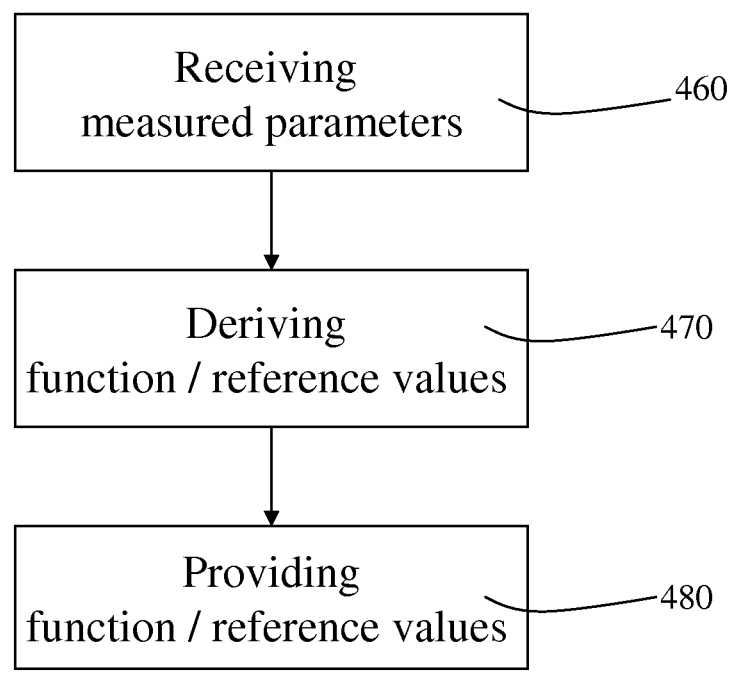

Reference is now made to FIG. 4, which is a flowchart illustrating a second exemplary method for wireless communications access security, according to an exemplary embodiment of the present invention.

A second exemplary method for wireless communications access security, according to an exemplary embodiment of the present invention, may be executed by a computer processor of a server computer, as described in further detail hereinabove.

The server computer communicates with client devices such as a smart mobile phone, a tablet computer, a laptop computer, etc., say with a client application which runs on the client device, as described in further detail hereinabove.

In the method, there are received 460 from each one of multiple client devices, one or more parameter sets say by the parameter receiver 260, as described in further detail hereinabove.

Each one of the parameter sets pertains to a respective, specific access point and includes one or more parameter values. The parameter values are measured during a wireless communication between the specific access point and the client device which the parameter set originates from.

The parameters measured by the client device may include, but are not limited to a variety of parameters which pertain to one or more of the access point's characteristics—say characteristics which belong to different ones of the OSI (Open Systems Interconnection) model layers, as described in further detail hereinabove.

For example, a network's access point, such as a mobile telephony base station or a Wi-Fi wireless router, usually allocates a channel to each client device authenticated and granted access to the network.

The allocated channel may restrict communication of the client device with the access point, to a specific frequency, bandwidth, time slot, etc., or any combination thereof, as known in the art—i.e. to specific OSI physical layer characteristics, as described in further detail hereinabove.

Thus in a first example, the client device measures one or more of the parameter values simply by reading the frequency, bandwidth, or time slot allocated by the access point, say from channel allocation data sent from the access point to the client device, as described in further detail hereinabove.

In a second example, the client device measures one or more of the parameter values, by measuring an intensity or another characteristic of a radio signal received from the active access point, etc., as known in the art.

In a third example, two or more of the parameters measured by the client device are SSIDs (Service Set Identifiers) of some or all access points which appear active during the wireless communication to the access point, as per a radio scan initiated on the client device, as described in further detail hereinabove.

Next, there is derived 470 a threat evaluation function from the received 460 parameter sets Optionally, there is further derived 470 a reference set of values for each respective one of at least some of the access points from the received 460 parameter sets which pertain to the access point, say by the function deriver 270.

Optionally, the reference sets are derived 470 from the parameter sets received 460 from the client devices, through one or more mathematical models applied on the measured values received 460 in the parameter sets.

For example, the reference sets may be derived 470 simply by averaging over each parameter's values which originate from different ones of the client devices, by a standard persistency analysis method, by one of the stochastic methods in current use, etc., or any combination thereof, as known in the art.

Thus, in one example, a first client device communicates with a first access point and during communication with the first access point, measures values of parameters which include: an intensity of a signal received from the first access point and a frequency of a channel allocated to the first client device by the first access point.

The first client device forwards a parameter set which includes the measured signal intensity and allocated frequency to the server computer.

Similarly, a second client device also communicates with the first access point and measures intensity of a signal which the second client device receives from the first access point, and a frequency of a channel allocated to the second client device by the first access point, and forwards the two to the server computer.

Further in the example, a third and other client devices measure and send values of the same parameters (i.e. the allocated frequency and the signal intensity) to the server computer.

Consequently, on the server computer, there is derived 470 a reference set of values from the parameter sets received 460 from the first, second, third, and other client devices, which reference set pertains to the specific, first access point.

In the example, for each access point, there are derived 470 two reference values from the signal intensities, by averaging over the signal intensity values measured by the client devices when in communication with the access point, to yield the two reference values—namely, the intensity mean and standard deviation.

Further in the example, for each access point, there are also derived 470 three reference values from the frequencies allocated to the client devices—namely, the lowest allocated frequency, the highest allocated frequency, and the difference between each two of the allocated frequencies.

Thus, in the example, a first derived 470 reference set includes both the two reference values derived 470 from the measured signal intensities and the three reference values derived 470 from the allocated frequencies (i.e. five reference values).

Further in the example, there are received 460 from each one of at least some of the client devices one or more parameter sets which pertain to a second access point.

Using the received 460 parameter sets which pertain to the second access point, there is further derived 470 a second reference set of values, which second reference set pertains to the specific, second access point.

Similarly, there may be derived 470 multiple reference sets of values, such that each one of the derived 470 reference sets pertains to an other access point, and is derived 470 from parameters measured by each one of at least some of the client devices when in communication with the other access point.

Optionally in the method, there is further maintained global data which maps all the derived 470 reference values by time, location and access point—say in a multi-dimensional database table, as known in the art.

Optionally, the global data is based on measurements of parameter values of access points in different regions and countries, by many client devices, thus implementing a worldwide crowd sourcing of access point reference data.

Thus, in one example, one of the client devices sends a new parameter set to the server computer. The new parameter set pertains to a specific access point and includes parameter values measured on a specific day of week, when the client device is in a specific location, as described in further detail hereinabove.

Consequently, there are updated one or more reference values maintained in the multi-dimensional table and mapped to the specific access point, week day, location, or any combination thereof—say reference values which give the access point's averaged signal and frequency for the week day and location.

Accordingly, one or more of the derived 470 reference sets are based on a sub-portion of the maintained global data, say on a segment of the multi-dimensional database table, which segment is delimited by time, location, and access point, and contains several different reference values.

For example, the segment may include a specific access point's average signal intensity, allocated frequency range, etc., for a specific time of communication by a client device, and location of the client device, as described in further detail hereinbelow.

In the method, there is further derived 470 a threat evaluation function from all parameter sets received 460 from the client devices, or rather from some of the client devices—say from client devices marked as trustworthy (say by an administrator or user of apparatus 2000), as described in further detail hereinabove.

Optionally, for deriving 470 the threat evaluation function, there are further used one or more indicators calculated on some or all the client devices, from parameter values measured by the client devices, as described in further detail hereinabove.

The derived 470 threat evaluation function, one or more of the derived 470 reference sets, or both the function and the one or more reference sets, are provided 480 by the server computer to a client device in communication with the server computer.

In a first example, when a user of a smart phone attempts to connect to a specific access point, a client application which runs on the smart phone's computer processor communicates a request for up-to-date reference values which pertain to the specific access point, to the server computer.

Based on the request, there is sent 480 from the server computer, a reference set which pertains to the specific access point, to the user's phone. The sent 480 reference set includes reference values derived 470 on the server for the specific access point.

In the example, there is further sent 480 from the server computer to the smart phone's client application, a threat evaluation function derived 470 on the server computer from parameter values measured by client devices during previous communications with access points, as described in further detail hereinabove.

In a second example, reference sets derived 470 on the server are sent 480 to the client device together with an update to the threat evaluation function periodically, say once a day or once an hour, as described in further detail hereinabove.

Optionally, in the method, the reference sets provided 480 to the client device, are selected for the providing 480, according to the client device's location, according to time, etc., or any combination thereof.

In a first example, one or more of the reference values in the reference sets are selected according to data which indicates the client device's location, and which is generated on the client device using GPS (Global Positioning System) or DGPS (Differential GPS) and sent to the server computer.

In a second example, one or more of the reference values are selected according to time, say according to an hour or week day in which the reference sets are to be provided to the client device, as described in further detail hereinabove.

In a third example, one or more of the reference values are selected according to both the time and the client device's location indicated by the data generated on the client device using GPS or DGPS, as described in further detail hereinabove.

Optionally, the reference values are selected by retrieving a segment of reference values from the global data, according to time and location (say from the multi-dimensional database table), as described in further detail hereinabove.

In one example, each one of the selected reference sets includes the specific access point's average signal intensity, allocated frequency range, etc., for a specific time of communication by any client device having the location of the client device in communication with the server computer, as described in further detail hereinabove.

Optionally, there is further received 460 from each client device of a group which includes one or more of the client devices, one or more indicator sets, and the threat evaluation function is derived 470 from both the received 460 indicator sets and the received 460 parameter sets.

Each one of the indicator sets received 460 from the client device of the group pertains to a specific one of the access points and includes one or more indicators.

Each indicator in the indicator set is calculated by the client device from at least one of the parameters measured by the client device during a wireless communication with the specific access point. Optionally, the calculation of at least one of the indicators is further based on at least one of the values received on the client device in the reference set which pertains to the specific access point.

Optionally, for deriving 470 the threat evaluation function, the received 460 indicator sets are sub-sampled, thus narrowing down the number of indicators to be used for deriving 470 the function.

For example, there may be removed duplicates from the indicator sets, there may be randomly selected a number of the indicators for the deriving 470, there may be discarded indicators which are known to be less predictive in as far as the maliciousness of an access point is concerned, etc.

Next, each one of at least a portion (say the portion left after the sub-sampling) of the received 460 indicator sets is annotated as malicious or non-malicious. The annotation may carried out in a supervised way (say manually, by an administrator), in an unsupervised way (say based on statistical deviation measured over all of the received 460 indicator values), etc., or in a way which combines the two.

Optionally, for deriving 470 the threat evaluation function from the indicator values in the annotated indicator sets, there are further used classification methods such as SVM (Support Vector Machines), Random Forests (of decision trees), etc., or any combination thereof, as known in the art.

Optionally, for deriving 470 the threat evaluation function, there are further used dimensionality changing methods such as Mercer Kernels Similarity Functions, Bootstrap Aggregation, etc., or any combination thereof, as known in the art.

Optionally, in the method there is further provided to the client device in communication with the server computer, a list of threat indications determined by one or more neighboring client devices and sent to the server computer by the neighboring client devices, say by the a threat indication sender.

Optionally, the list of determined threat indications is sent to the client device in communication with the server computer, even before the client device measures the parameters.

Thus, in one example, several client devices identify certain access points as malicious, say using the methods of the present invention or using one or more different methods, and convey data on the access points identified as malicious to the server computer.

Consequently, in the example, the client device in communication with the server computer is provided with a list of SSIDs of those of the access points identified as malicious, which are situated within a predefined geographical distance from the client device's location as extracted by the client device, say using GPS.

Figure 5:
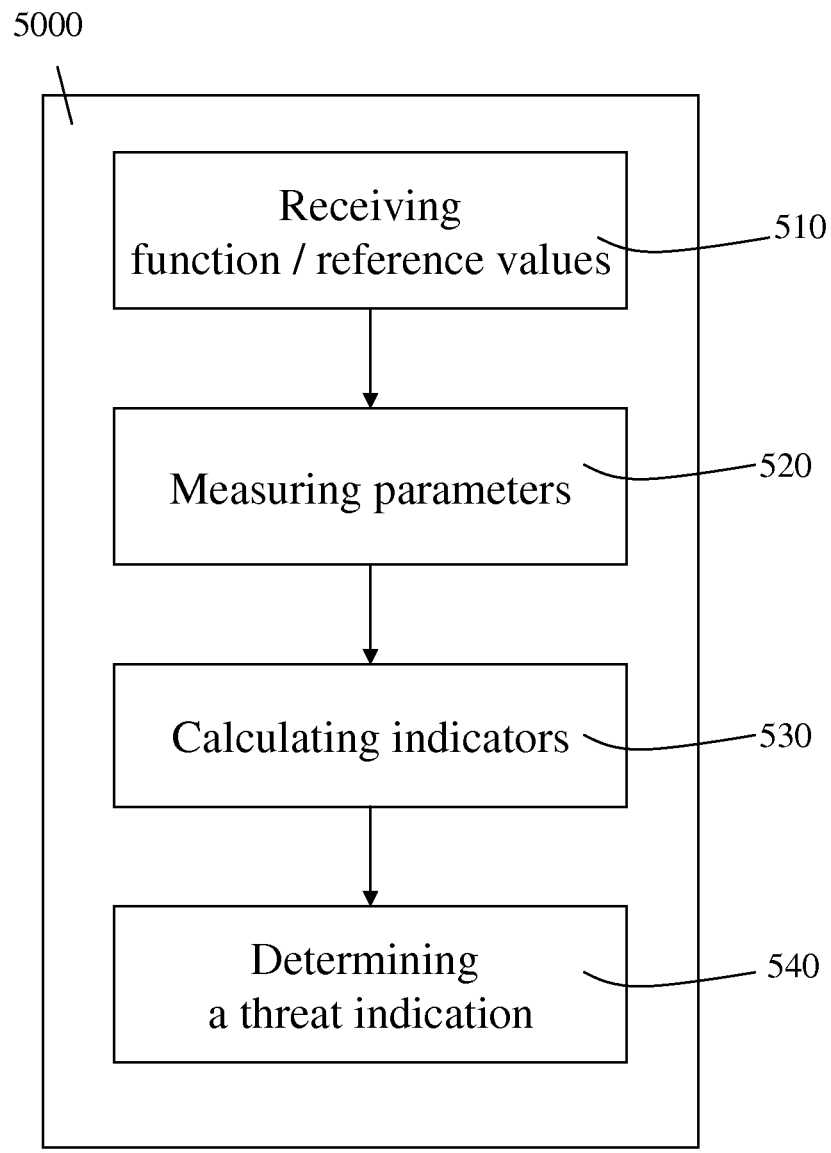

Reference is now made to FIG. 5, which is a block diagram schematically illustrating a first exemplary computer readable medium storing computer executable instructions for performing steps of wireless communications access security, according to an exemplary embodiment of the present invention.

According to an exemplary embodiment of the present invention, there is provided a non-transitory computer readable medium 5000 which stores computer executable instructions for performing steps of wireless communications access security on a client device such as a smart cellular phone or a tablet computer.

The computer readable medium 5000 may include, but is not limited to: a RAM (Rapid Access Memory), a DRAM (Dynamic RAM), a ROM (Read Only Memory), a PROM (Programmable ROM), an EPROM (Erasable ROM), a Micro SD (Secure Digital) Card, a CD-ROM, a Solid State Drive (SSD), a USB-Memory, a Hard Disk Drive (HDD), etc.

The computer readable medium 5000 stores computer executable instructions, for performing steps of wireless communications access security.

The instructions may be executed upon one or more computer processors of a client device capable of communicating with a wireless access point, say on a computer processor of a device such as smart phone (say an Apple® iPhone or a Samsung® Galaxy cellular phone) or a tablet computer (say an Apple® iPad).

For example, the instructions may be in a form of a computer application such an iPhone® App, which may be downloaded to the user's smart phone (say Apple® iPhone), stored on the computer readable medium 5000 (say on the phone's ROM), and executed on the phone's processor.

The computer executable instructions include a step of receiving 510 a threat evaluation function from a server computer, as described in further detail hereinabove.

Optionally, computer executable instructions further include receiving 510 from the server computer, one or more reference sets of values. Each one of the received 510 reference sets pertains to a respective access point, as described in further detail hereinabove.

In one example, the threat evaluation function, the reference sets of values, or both the function and the reference sets, are received 510 from a server computer—say from a server computer in remote communication with the client device, over the internet.

Optionally, the received 510 threat evaluation function is a function derived by the server computer from parameters measured by multiple client devices during wireless communication with access points, as described in further detail hereinabove.

Optionally, each one of the received 510 reference sets is a set of reference values derived by the server computer from parameters measured by multiple client devices during wireless communication with access points, as described in further detail hereinabove.

The computer executable instructions may further include a later step of receiving 510 an update to the threat evaluation function from the computer server—say as a modification to one or more coefficients of a mathematical formula which represents the threat evaluation function, as described in further detail hereinabove.

During the receipt 510 or at a later stage, the client device may be in wireless communication with an active access point, say with an active one of the access points which the received 510 reference sets pertain to.

For example, the client device may receive a signal from the active access point, establish a connection to the active access point, register on the active access point, browse the internet via the active access point, etc., as known in the art.

The computer executable instructions further include a step of measuring 520 one or more parameters during the wireless communication of the client device to the active access point, as described in further detail hereinabove.

The measured 520 parameters may include, but are not limited to parameters which pertain to one or more characteristics—say characteristics which belong to different ones of the OSI (Open Systems Interconnection) model layers, as described in further detail hereinabove.

For example, a network's access point, such as a mobile telephony base station or a Wi-Fi wireless router may restrict communication of the client device to the access point, to a specific frequency, bandwidth, time slot, etc., or to any combination thereof—i.e. to specific radio-level OSI physical layer characteristics.

Thus, in a first example, one or more of the parameters are measured 520 simply by reading the frequency, bandwidth, or time slot, say from data on a channel allocated by the access point to the client device, which data is sent to the client device, as described in further detail hereinabove.

In a second example, one or more of the measured 520 parameters is an intensity or another characteristic of a radio signal received from the active access point, etc., as known in the art.

In a third example, one or more of the measured 520 parameters is the active access point's MAC (Media Access Control), a characteristic which belongs to the Point-to-Point Protocol (PPP) or to the ITU-T protocol, or another OSI data-link layer characteristic of the access point.

In a fourth example, one of the measured 520 parameters is the SSID (Service Set Identifier) shown by the active access point, as described in further detail hereinabove.

In a fifth example, two or more of the measures 520 parameters are SSIDs (Service Set Identifiers) of some or all access points which appear active during the wireless communication to the access point upon a radio scan initiated on the client device, as described in further detail hereinabove.

The computer executable instructions further include a step of calculating 530 one or more indicators.

Each one of the indicators is calculated 530 from one or more of the measured 520 parameters.

Optionally, the calculation 530 of one or more of the indicators is further based on one or more of the values received 510 in the reference set which pertains to the active access point.

In one example, the indicator is calculated 530 by a simple averaging over values of one of the parameters, say on the parameter's values as measured 520 during a two hours long time frame preceding the indicator's calculation 530.

Optionally, the indicator is calculated 530 by a simple comparison between one of the measured 520 parameter values and a reference value calculated by the server computer and received 510 in the reference set which pertains to the active access point.

Thus, in a first example, the indicator is calculated 530 by subtraction of the active access point's signal intensity from a reference value (say an average of intensities previously measured by neighboring client devices when in communication with the active access point), as described in further detail hereinabove.

In a second example, the indicator is calculated 530 based on a stochastic model derived on the server computer for the active access point. In the example, the stochastic model assumes a normal distribution of the parameter's value, and the indicator is calculated 530 using an average and a standard deviation received 510 in the reference set which pertains to the access point.

The average and standard deviation are calculated for the parameter (say the signal intensity) on the server computer, from values of the parameter (say the intensity) as previously measured by neighboring client devices, as described in further detail hereinabove.

Optionally, the computer executable instructions further include maintaining time based historic data reflecting a change in value of at least one of the measured 520 parameters over time. In one example, the historic data records and maps the values measured 520 for each access point to different dates and hours of communication, etc., as described in further detail hereinabove.

Consequently, the calculation 530 of the indicators may further be based on the maintained time based historic data.

The computer executable instructions further include a step of determining 540 a threat indication for the active access point, by applying the received 510 threat evaluation function on the calculated 530 indicators, as described in further detail hereinabove.

Thus, in one example, the threat evaluation function yields a result which indicates that the active access point is malicious, whereas in another example, the threat evaluation function yields a result which indicates that the active access point is probably not malicious.

Optionally, the computer executable instructions further include a step following the determining 540, in which step the user of the client device is warned, the communication with the active access point is restricted according to the determined 540 threat indication, etc.

For example, when there is determined 540 that the active access point is malicious, the user may be warned on the client device's screen, the communication to the active access point may be restricted (say to specific messages only) or suspended, the communication may be diverted to another access point, etc., or any combination thereof.

Optionally, the computer executable instructions further include a step of indicating a location of the client device to the server computer, as described in further detail hereinabove.

For example, the computer executable instructions may include a step of sending location data derived on the client device using a GPS (Global Positioning System) receiver or a DGPS (Differential GPS) receiver installed on the client device, to the server computer, as described in further detail hereinabove.

Optionally, one or more of the received 510 reference sets is a set of reference values selected by the server computer at least according to the indicated location, as described in further detail hereinabove.

Optionally, one or more of the received 510 reference sets is a set of reference values selected by the server computer at least according to time—say a day, an hour, etc., as described in further detail hereinabove.

Optionally, one or more of the received 510 reference sets is a set of reference values selected by the server computer at least according to the indicated location and time, as described in further detail hereinabove.

Optionally, the computer executable instructions further include receiving 510 from the server computer, a list of access points determined to be malicious by one or more neighboring client devices—say SSIDs of the access points determined to be malicious, as described in further detail hereinabove.

Accordingly, the computer executable instructions may further include a step in which, based on the received 510 list of access points determined to be malicious, the client device's user may be warned, the communication to the access points determined to be malicious may be restricted, suspended, or diverted to another access point, etc.

Figure 6:
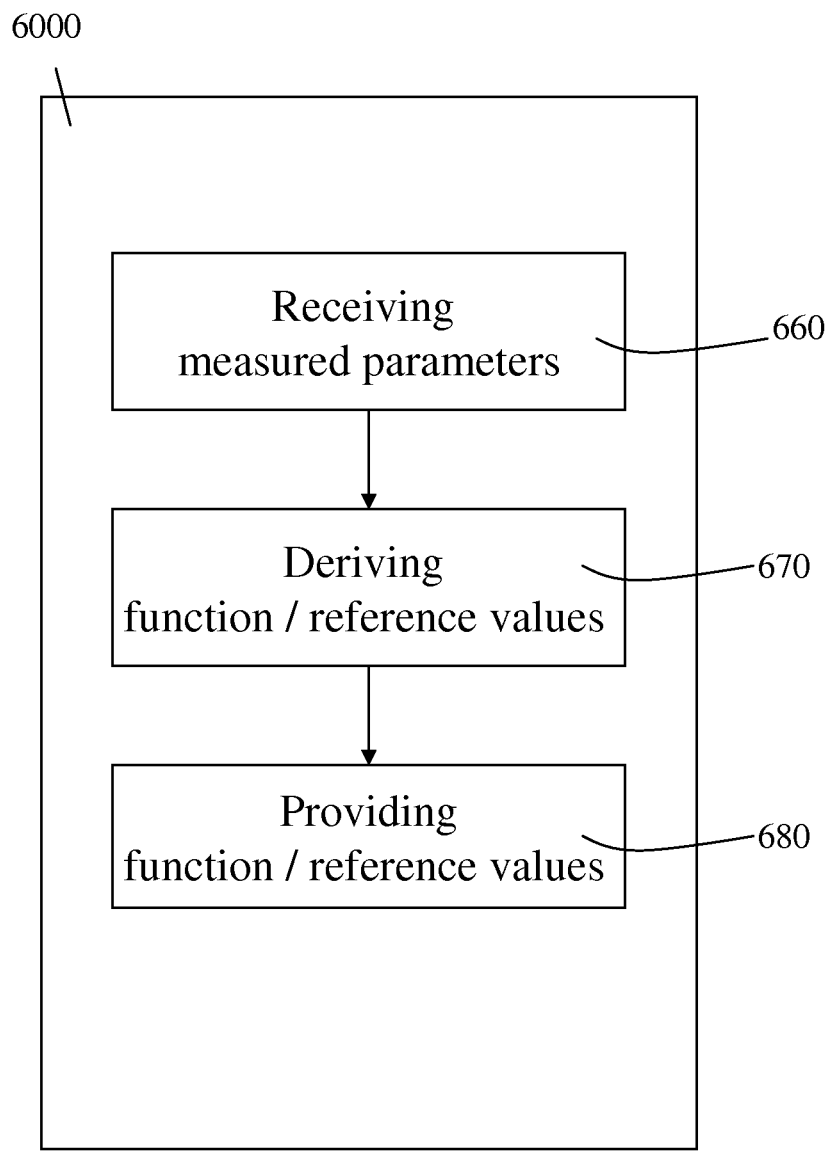

Reference is now made to FIG. 6, which is a block diagram schematically illustrating a second exemplary computer readable medium storing computer executable instructions for performing steps of wireless communications access security, according to an exemplary embodiment of the present invention.

According to an exemplary embodiment of the present invention, there is provided a non-transitory computer readable medium 6000, such as a CD-ROM, a USB-Memory, a Hard Disk Drive (HDD), a Solid State Drive (SSD), etc.

The computer readable medium 6000 stores computer executable instructions, for performing steps of wireless communications access security on a server computer, say on one or more computer processor of the server computer.

The server computer may include one or more computers, which may communicate with one or more client devices such as a smart phone (say an Apple® iPhone or a Samsung® Galaxy cellular phone) or a tablet computer (say an Apple® iPad), as described in further detail hereinabove.

The computer executable instructions include a step of receiving 660 from each one of multiple client devices, one or more parameter sets, as described in further detail hereinabove.

Each one of the parameter sets pertains to a respective access point and includes one or more parameter values. The parameter values are measured during a wireless communication between the access point and the client device which the parameter set originates from.

The parameters measured by the client device may include, but are not limited to a variety of parameters which pertain to one or more of the access point's characteristics—say characteristics which belong to different ones of the OSI (Open Systems Interconnection) model layers, as described in further detail hereinabove.

Thus, in a first example, the client device measures one or more of the parameter values simply by reading the frequency, bandwidth, or time slot allocated by the access point to the client device, from channel allocation data sent from the access point to the access device, as described in further detail hereinabove.

In a second example, the client device measures one or more of the parameter values, by measuring an intensity or another characteristic of a radio signal received from the active access point, etc., as known in the art.

In a third example, two or more of the parameters measured by the client device are SSIDs (Service Set Identifiers) of some or all access points which appear active during the wireless communication to the access point, as per a radio scan initiated on the client device, as described in further detail hereinabove.

The computer executable instructions further include a step of deriving 670 a threat evaluation function from the received 660 parameter sets.

Optionally, according to the computer executable instructions, there is further derived 670 a reference set of values for each respective one of at least some of the access points from the received 660 parameter sets which pertain to the access point.

Optionally, the reference sets are derived 670 from the parameter sets received 660 from the client devices, through one or more mathematical models applied on the measured values received 660 in the parameter sets.

For example, the reference sets may be derived 670 simply by averaging over each parameter's values which originate from different ones of the client devices, by a standard persistency analysis method, by one of the stochastic methods in current use, etc., or any combination thereof, as known in the art.

Thus, in one example, a first client device communicates with a first access point and during communication with the first access point, measures values of parameters which include: an intensity of a signal received from the first access point and a frequency of a channel allocated to the first client device by the first access point.

The first client device forwards a parameter set which includes the measured signal intensity and allocated frequency to the server computer.

Similarly, a second client device also communicates with the first access point and measures intensity of a signal which the second client device receives from the first access point, and a frequency of a channel allocated to the second client device by the first access point, and forwards the two to the server computer.

Further in the example, a third and other client devices measure and send values of the same parameters (i.e. the allocated frequency and the signal intensity) to the server computer.

Consequently, on the server computer, there is derived 670 a reference set of values from the parameter sets received 660 from the first, second, third, and other client devices, which reference set pertains to the specific, first access point.

In the example, for each access point, there are derived 670 two reference values from the signal intensities, by averaging over the signal intensity values measured by the client devices when in communication with the access point, to yield the two reference values—namely, the intensity mean and standard deviation.

Further in the example, for each access point, there are also derived 670 three reference values from the frequencies allocated to the client devices—namely, the lowest allocated frequency, the highest allocated frequency, and the difference between each two of the frequencies.

Thus, in the example, a first derived 670 reference set includes both the two reference values derived 670 from the measured signal intensities and the three reference values derived 670 from the allocated frequencies (i.e. five reference values).

Further in the example, there are received 660 from each one of at least some of the client devices one or more parameter sets which pertain to a second access point.

Using the received 660 parameter sets which pertain to the second access point, there is further derived 670 a second reference set of values, which second reference set pertains to the specific, second access point.

Similarly, there may be derived 670 multiple reference sets of values, such that each one of the derived 670 reference sets pertains to an other access point, and is derived 670 from parameters measured by each one of at least a few of the client devices when in communication with the other access point.

Optionally, the computer executable instructions further include instructions for maintaining global data which maps all derived 670 reference values by time, location and access point—say in a multi-dimensional database table, as known in the art.

Optionally, the global data is based on measurements of parameter values of access points in different regions and countries, by many client devices, thus implementing a worldwide crowd sourcing of access point reference data.

Thus, in one example, one of the client devices sends a new parameter set to the server computer. The new parameter set pertains to a specific access point and includes parameter values measured on a specific day of week, when the client device is in a specific location.

Consequently, there are updated one or more reference values maintained in the multi-dimensional table and mapped to the specific access point, week day, location, or any combination thereof—say reference values which give the access point's averaged signal and frequency for the week day and location.

Accordingly, one or more of the derived 670 reference sets are based on a sub-portion of the maintained global data, say on a segment of the multi-dimensional database table, which segment is delimited by time, location, and access point, and contains several different reference values.

For example, the segment may include a specific access point's average signal intensity, allocated frequency range, etc., for a specific time of communication by a client device, and location of the client device, as described in further detail hereinabove.

The computer executable instructions further include a step of deriving 670 a threat evaluation function from all parameter sets received 660 from the client devices, or rather from some of the client devices—say only from client devices marked as trustworthy (say by an administrator of the server computer), as described in further detail hereinabove.

Optionally, for deriving 670 the threat evaluation function, there are further used one or more indicators calculated on some or all the client devices, from parameter values measured by the client devices, as described in further detail hereinabove.

The computer executable instructions further include a step of providing 680 the derived 670 threat evaluation function, one or more of the derived 670 reference sets, or both the function and the one or more reference sets, to a client device in communication with the server computer.

In a first example, when a user of a smart phone attempts to connect to a specific access point, a client application which runs on the smart phone's computer processor communicates a request for up-to-date reference values which pertain to the specific access point, to the server computer.

Based on the request, there is sent 680 from the server computer, a reference set which pertains to the specific access point, to the user's phone. The sent 680 reference set includes reference values derived 670 for the specific access point.

In the example, there is further sent 680 from the server computer to the smart phone's client application, a threat evaluation function derived 670 on the server computer from parameter values measured by client devices during previous communications with access points, as described in further detail hereinabove.

In a second example, reference sets derived 670 on the server are sent 680 to the client device together with an update to the threat evaluation function periodically, say once a day or once an hour, as described in further detail hereinabove.

Optionally, the computer executable instructions further include a step of selecting the reference sets, for providing 680 to the client device in communication with the server computer, according to the client device's location, time, etc., or any combination thereof as described in further detail hereinabove.

In a first example, one or more of the reference values are selected according to data which indicates the client device's location, and which is generated on the client device using GPS (Global Positioning System) or DGPS (Differential GPS), as described in further detail hereinabove.

In a second example, one or more of the reference values are selected according to time, say according to the hour or week day in which the reference sets are to be provided 680 to the client device, as described in further detail hereinabove.

In a third example, one or more of the reference values are selected according to both the time and the client device's location indicated by the data generated on the client device using GPS or DGPS, as described in further detail hereinabove.

Optionally, the reference values are selected by retrieving a segment of reference values from the global data, according to time and location (say from the multi-dimensional database table), as described in further detail hereinabove.

In one example, each one of the selected reference sets includes the specific access point's average signal intensity, allocated frequency range, etc., for a specific time of communication by any client device having the location of the client device in communication with the server computer, as described in further detail hereinabove.

Optionally, the computer executable instructions further include instructions for receiving 660 from each client device of a group which includes one or more of the client devices, one or more indicator sets, and for deriving 670 the threat evaluation function from both the received 660 indicator sets and parameter sets.

Each one of the indicator sets received 660 from the client device of the group pertains to a specific one access points and includes one or more indicators.

Each indicator value in the indicator set is calculated by the client device from at least one of the parameters measured by the client device during a wireless communication with the specific access point. Optionally, the calculation of at least one of the indicators is further based on at least one of the values received on the client device in the reference set which pertains to the specific access point.

Optionally, according to the computer executable instructions, for deriving 670 the threat evaluation function, the received 660 indicator sets are sub-sampled, thus narrowing down the number of indicators to be used for deriving 670 the function.

For example, there may be removed duplicates from the indicator sets, there may be randomly selected a number of the indicators for the deriving 670, there may be discarded indicators which are known to be less predictive in as far as the maliciousness of an access point is concerned, etc., as described in further detail hereinabove.

The computer executable instructions may further include a step in which each one of at least a portion (say the portion left after the sub-sampling) of the received 660 indicator sets is annotated as malicious or non-malicious.

The annotation may carried out in a supervised way (say manually, by an administrator), in an unsupervised way (say based on statistical deviation measured over all of the received 660 indicator values), etc., or in a way which combines the two.

Optionally, according to the computer executable instructions, for deriving 670 the threat evaluation function from the indicator values in the annotated indicator sets, there are further used classification methods such as SVM (Support Vector Machines), Random Forests (of decision trees), etc., or any combination thereof, as known in the art.

Optionally, according to the computer executable instructions, for deriving 670 the threat evaluation function from, there are further used dimensionality changing methods such as Mercer Kernels Similarity Functions, Bootstrap Aggregation, etc., or any combination thereof, as known in the art.

Optionally, the computer executable instructions further include a step of providing to the client device in communication with the server computer, a list of threat indications determined by one or more neighboring client devices and sent to the server computer by the neighboring client devices.

Optionally, according to the computer executable instructions, the list of determined threat indications is sent to the client device in communication with the server computer, even before the client device measures the parameters.

Thus, in one example, several client devices identify certain access points as malicious, say using the methods of the present invention or using one or more different methods, and convey data on the access points identified as malicious to the server computer, as described in further detail hereinabove.

Consequently, in the example, the client device in communication with the server computer is provided with a list of SSIDs of those of the access points identified as malicious, which are situated within a predefined geographical distance from the client device's location as extracted by the client device, say using GPS.

It is expected that during the life of this patent many relevant devices and systems will be developed and the scope of the terms herein, particularly of the terms "Computer", "Server Computer", "Client Device", "Access Point", "Tablet", "Smart Phone", "Laptop", "CD-ROM", "Router", "USB-Memory", "Hard Disk Drive (HDD)", "Solid State Drive (SSD)", "DRAM", "ROM", "PROM", "EPROM", "DRAM", "Micro SD", "GPS", "DGPS", "WLAN", "Cellular Telephony", "Wi-Fi" and "Internet", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method for wireless communications access security, the method comprising steps a computer processor of a client device is programmed to perform, the steps comprising:
    receiving a threat evaluation function from a server computer;
    measuring at least one parameter during a wireless communication with an active access point;
    calculating at least one indicator, each one of the indicators being calculated from at least one of the measured parameters; and
    determining a threat indication for the active access point by applying the threat evaluation function on the calculated indicators, wherein the threat evaluation function is derived by the server computer from at least one parameter set received by the server computer from each one of a plurality of client devices, each parameter set pertaining to a respective access point and comprising at least one parameter measured during a wireless communication between the client device that the parameter set is received from and the access point.

2. The method of claim 1, further comprising receiving at least one reference set of values from the server computer, each one of the received reference sets pertaining to a respective access point, wherein said calculating of at least one of the indicators is further based on at least one value received in the reference set pertaining to the active access point.

3. The method of claim 1, further comprising restricting the communication with the active access point according to the determined threat indication.

4. The method of claim 1, further comprising maintaining time based historic data reflecting a change in value of at least one of the measured parameters over time, wherein said calculating of the indicators is further based on the maintained time based historic data.

5. The method of claim 2, further comprising a preliminary step of sending data indicating location of the client device to the server computer, wherein at least one of the received reference sets is a set of at least one reference value selected by the server computer at least according to the indicated location.

6. The method of claim 2, wherein at least one of the reference sets is a set of at least one reference value selected by the server computer at least according to time.

7. The method of claim 2, further comprising a preliminary step of sending data indicating location of the client device to the server computer, wherein at least one of the reference sets is a set of at least one reference value selected by the server computer at least according to both time and the indicated location.

8. The method of claim 2, further comprising receiving from the server computer a list of threat indications determined by at least one neighboring client device.

9. The method of claim 2, wherein each one of the reference sets is a set of reference values derived by the server computer from a plurality of parameters measured by a plurality of client devices during wireless communication with the respective access point.

10. An apparatus for wireless communications access security, the apparatus comprising:
a computer processor of a client device;
a function receiver, implemented on said computer processor, configured to receive a threat evaluation function from a server computer;
a parameter measurer, implemented on said computer processor, configured to measure at least one parameter during a wireless communication of the client device with an active access point;
an indicator calculator, implemented on said computer processor, in communication with said function receiver and said parameter measurer, configured to calculate at least one indicator, each one of the indicators being calculated from at least one of the measured parameters; and
a threat determiner, implemented on said computer processor, in communication with said indicator calculator, configured to determine a threat indication for the active access point by applying the received threat evaluation function on the calculated indicators, wherein the threat evaluation function is derived by the server computer from at least one parameter set received by the server computer from each one of a plurality of client devices, each parameter set pertaining to a respective access point and comprising at least one parameter measured during a wireless communication between the client device that the parameter set is received from and the access point.

11. A non-transitory computer readable medium storing computer processor executable instructions for performing steps of wireless communications access security on a client device, the steps comprising:
receiving a threat evaluation function from a server computer;
measuring at least one parameter during a wireless communication with an active access point;
calculating at least one indicator, each one of the indicators being calculated from at least one of the measured parameters; and
determining a threat indication for the active access point by applying the threat evaluation function on the calculated indicators, wherein the threat evaluation function is derived by the server computer from at least one parameter set received by the server computer from each one of a plurality of client devices, each parameter set pertaining to a respective access point and comprising at least one parameter measured during a wireless communication between the client device that the parameter set is received from and the access point.

12. A computer implemented method for wireless communications access security, the method comprising steps a server computer is programmed to perform, the steps comprising:
from each one of a plurality of client devices, receiving at least one parameter set, each parameter set pertaining to a respective access point and comprising at least one parameter measured during a wireless communication between the client device and the access point;
deriving a threat evaluation function from the parameter sets received from the client devices; and
providing the derived threat evaluation function to a client device in communication with the server computer.

13. The method of claim 12, further comprising deriving a reference set of values for each respective one of the access points from the received parameter sets pertaining to the access point, and providing at least one of the derived reference sets to the client device in communication with the server computer.

14. The method of claim 12, further comprising:
from at least one of the plurality of client devices, receiving at least one indicator set, each one of the indicator sets pertaining to a respective one of the access points and comprising at least one indicator calculated by the client device from at least one parameter measured by the client device during a wireless communication with the access point; and
deriving the threat evaluation function from the received indicator sets and the received parameter sets.

15. The method of claim 13, further comprising a step of selecting at least one of the values in the derived reference set for said providing, according to location of the client device in communication with the server computer.

16. The method of claim 13, further comprising a step of selecting at least one of the values in the derived reference set for said providing, according to time.

17. The method of claim 13, further comprising a step of selecting at least one of the values in the derived reference set for said providing, according to both time and location of the client device in communication with the server computer and time.

18. The method of claim 12, further comprising sending to the client device in communication with the server computer a list of threat indications determined by at least one neighboring client device.

19. The method of claim 13, further comprising maintaining global data mapping a plurality of reference values by time, location and access point, wherein at least one of the reference sets provided to the client device in communication with the server computer is based on a sub-portion of the maintained global data.

20. An apparatus for wireless communications access security, the apparatus comprising:
a computer processor of a server computer;
a parameter receiver, implemented on said computer processor, configured to receive from each one of a plurality of client devices, at least one parameter set, each parameter set pertaining to a respective access point and comprising at least one parameter measured during a wireless communication between the access point and the client device;
a function deriver, implemented on said computer processor, in communication with said parameter receiver, configured to derive a threat evaluation function from the parameter sets received from the client devices; and
a function provider, implemented on said computer processor, in communication with said function deriver, configured to provide the derived threat evaluation function to a client device in communication with the server computer.

21. A non-transitory computer readable medium storing computer processor executable instructions for performing steps of wireless communications access security on a server computer, the steps comprising:
from each one of a plurality of client devices, receiving at least one parameter set, each parameter set pertaining to a respective access point and comprising at least one parameter measured during a wireless communication between the client device and the access point;
deriving a threat evaluation function from the parameter sets received from the client devices; and
providing the derived threat evaluation function to a client device in communication with the server computer.

* * * * *